Nov. 18, 1958    E. J. MARTIN ET AL    2,861,234
SERVO CONTROLLED FOLLOWER SYSTEM
Filed March 15, 1954    2 Sheets-Sheet 1
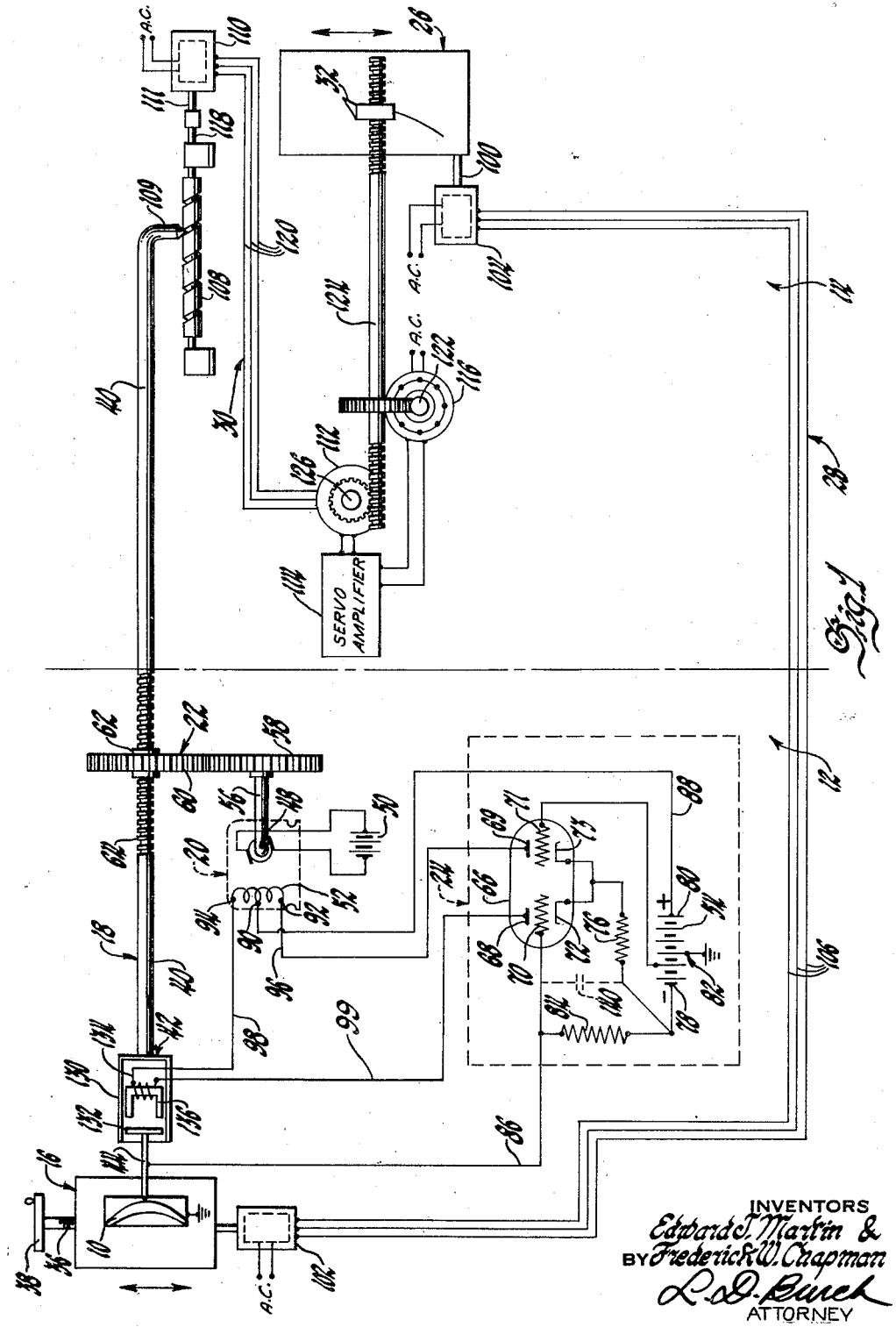
INVENTORS
Edward J. Martin &
BY Frederick W. Chapman
ATTORNEY

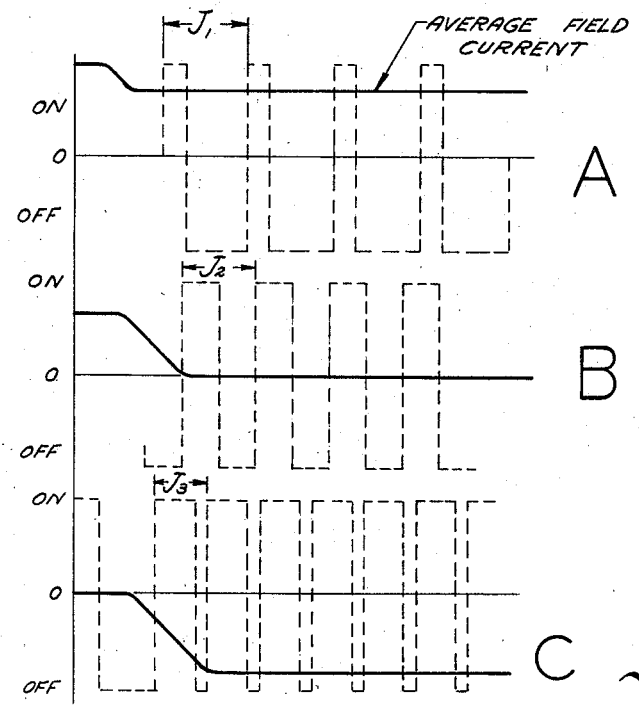
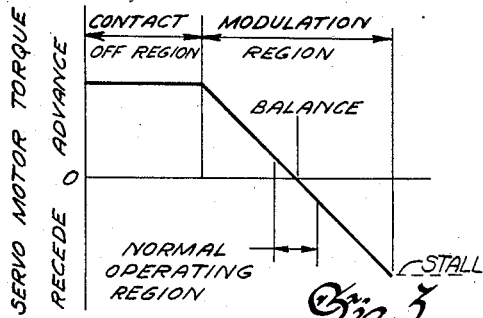
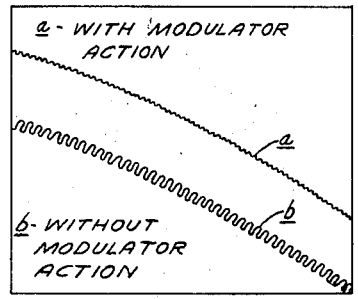
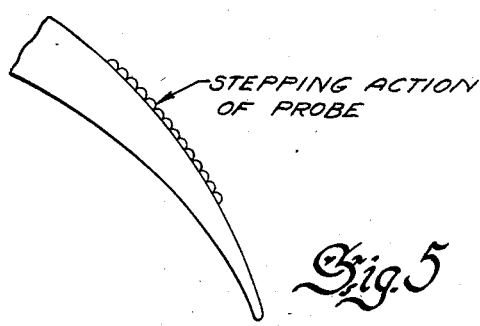

2,861,234
Patented Nov. 18, 1958

2,861,234
SERVO CONTROLLED FOLLOWER SYSTEM

Edward J. Martin, Pleasant Ridge, and Frederick W. Chapman, Birmingham, Mich., assignors to General Motors Corporation, Detroit, Mich., a corporation of Delaware Application March 15, 1954, Serial No. 416,367

15 Claims. (Cl. 318—31)

This invention relates to servo controlled follower systems and more particularly, to a servo follower system which features a modulated sensing device and associated control for producing a motion corresponding to the movement, position or the shape of an object. The invention is specially suited for use as a precision inspection device for checking the surface contour of articles of various configuration and has other useful applications as a position sensing device in indicating instruments and automatic duplicating or copying controls for machine tools and other devices with which it is desired to produce a facsimile of an original object.

As an inspection device, the invention is of special utility in connection with the production of blading of the type used in compressors and turbines of jet engines in which the precision of fabrication assumes great importance. In this field a system of checking has evolved in which the blade or bucket to be checked is moved past a spring loaded surface probe or stylus the motion of which is translated by a selsyn motor controlled servo system to acutate a pen tracer to reproduce, usually to enlarged scale, the object surface contours on a line drawing. These line contours are compared with master contours to determine if the buckets conform to the limits of precision deemed necessary.

To fulfill the accuracy demanded of such a system, it has been found necessary to use a sharp point and considerable spring tension on the probe. This combination of design factors causes severe wear of the point of the probe when used with buckets of hard material or produces scratching or penetration of buckets made of soft materials, thus affecting the accuracy of the resulting trace and marring the article.

In the foregoing aspect, the invention has among its objects to provide an improved contour-checking instrument which avoids the aforementioned objectionable characteristics of prior forms of contour checking instruments. More specifically, the invention seeks to provide a servo controlled follower system that employs an object surface engaging probe or member which exerts extremely light probe contact pressure and permits of the use of a sharp probe point and yet does not scratch or penetrate the object surface.

In another aspect, the invention has for an object to provide a servo controlled position sensing and follower system which exhibits a linear response characteristic over a range of operation where the probe or sensing element contacts the surface of the object and which provides a restoring force or torque directly proportional to the probe displacement deviation from a "balance" position to maintain a predetermined ratio of "dwell" and "off" times of the probe point with the surface of the object; to maintain the probe within a predetermined narrow range of vibratory movement or displacement from the surface of the object; or to maintain the vibration of the probe within a predetermined frequency range.

In a related aspect, the invention has for an object to provide a servo controlled position sensing and follower system having pulse-time, pulse-frequency and probe position modulation characteristics, variations in any one or combination of which constitutes a basis for control in the system.

In another aspect, the invention has for an object to provide a servo controlled position sensing and follower system in which overshooting and hunting caused by inertia and other unstabilizing effects of the system are substantially eliminated.

The above and other objects, features and advantages attending the present invention will appear more fully from the following detailed description and drawings, wherein:

Fig. 1 is a diagrammatic and electrical schematic illustration of apparatus in accordance with the present invention;

Figs. 2A, B and C and Fig. 3 are curves which are useful in understanding the operation of the present invention;

Fig. 4 is a part of a record obtained with two different modes of operation of the invention;

Fig. 5 illustrates the movement of the probe of the present invention along the surface of an object whose contour is being followed.

Referring to Fig. 1 of the drawings, the invention is shown applied to a contour or profile follower system for tracing the shape of an object such as a turbine bucket 10 and comprises, in the main, an electronic contour follower unit 12, shown to the left of the dashed vertical line, and a recording unit 14, shown to the right thereof. The drawings are generally of a diagrammatic nature to bring out principles of operation rather than particular details of construction and essential arrangement of parts which, for the most part, are standard known articles of equipment or can be readily constructed to serve particular purposes.

The follower unit 12 comprises a compound slide carriage 16 on which the bucket is mounted, a translatable probe assembly 18, a reversible servo drive unit 20 belted or geared through a mechanical drive arrangement 22 to drive the probe assembly in a direction to contact the surface of the bucket, and a control unit 24 which supplies a control stimulus to control the motion of the servo drive unit. The recording unit 14 comprises a positionable paper chart recorder 26 driven by a carriage position transmission system 28 and a probe position transmission system 30 which is coupled to the tracer pen 32 of the chart recorder.

While only one probe unit is shown, when the instrument is being used to check both sides of a part, as is done with turbine blades, two probe units are used, tracing on opposite sides of the part, each controlling a separate tracer pen.

The carriage 16 is movable on a lead screw 36 adapted for manual drive by the handwheel 38 or automatic drive by a synchronous motor (not shown) and also may be provided with elevation controls, as desired. In the present illustration the carriage is moved along a rectilinear path normal to the direction of movement of the probe assembly 18, although it is apparent that the carriage may be moved along paths other than that described.

The probe assembly 18 includes an elongated rod 40 which carries on one end thereof a pickup transducer or tracer head 42 having an electrically conductive light needle-like element 44, hereinafter called the probe point, extending therefrom in a direction to contact the surface of the object. The pickup transducer is the sensing instrumentality of the present invention and, in accordance with an important aspect thereof, is adapted to provide a probe modulating action which keeps the probe point in periodic contact with the object so as to avoid scratching and penetrating the surface thereof, as will be explained more fully hereinafter.

The servo drive unit 20 may be a fractional horsepower (say, 1/50 H. P.) D. C. motor having an armature 48 energized from a main source of power 50 and a split field winding 52 energized from a separate auxiliary D. C. source, as a battery 54, through the servo drive control unit 24. The motor shaft 56 is coupled to the probe assembly 18 through the mechanical drive system 22 which may comprise a driving gear 58 mounted on the motor shaft and meshing with a driven gear 60. The hub 62 of the driven gear is internally threaded to constitute a drive nut that cooperates with a lead screw 64 which is provided on the intermediate portion of the probe rod 40 carrying the driven gear, whereby the probe rod assembly 18 may be moved either towards or away from the bucket in a direction at right angles to the carriage movement.

The servo drive control unit 24 may be an electronic amplifier having a pair of space discharge paths provided by a pair of individual vacuum tubes or a dual vacuum tube 66, such as of the 12AT7 variety, having a pair of anodes 68, 69, a pair of control grid electrodes 70, 71 and a pair of interconnected cathodes 72, 73. The vacuum tube is connected in a cathode phase inverter circuit in which the cathodes 72, 73 are connected to the negative terminal of the auxiliary battery source 54 through a common cathode self-biasing resistor 76 and the push-pull plate circuit of the amplifier connected to the forward and reverse fields of the servo drive motor, as brought out more fully below. The grid 71 of one section ($P_2$) of the amplifier tube is connected to a point intermediate the negative terminal 78 and positive terminal 80 of the auxiliary source and below the mid-potential point 82 thereof, shown connected to ground. The grid 70 of the other section ($P_1$) of the amplifier tube is connected to the negative side of the auxiliary source 54 through a high resistance grid resistor 84 and is normally at a lower potential than its cathode 72 by reason of the biasing resistor 76.

A branch conductor 86 extends from a point between the grid 70 and the grid resistor 84 to the probe point 44 of the pickup unit and provides a circuit for altering the bias of the grid 70 which in turn affects the bias of grid 71 through the common cathode biasing resistor to effect a push-pull operation of the tube anodes when the probe point contacts the electrically conducting object 10, shown connected to the ground. The positive side 80 of the auxiliary source is connected over conductor 88 to the common or mid-terminal 90 of the split field servomotor winding 52, the end terminal 92 of the two end terminals 92, 94 thereof being connected directly to the anode 69 over a conductor 96. The other end terminal 94 of the field winding is connected over conductor 98 to the anode 68 either directly or through the pickup transducer unit 42 depending upon whether or not the latter is separately excited, as will be explained more fully below.

In the recording unit 26 is a positionable chart of a conventional recorder in which a driving drum unrolls and moves a roll of ruled paper across a fixed table or backing plate in a direction at right angles to the movement of the tracer pen 32. A drive shaft 100 connected to the paper drive drum permits the recorder to be driven in synchronism with the motion of the carriage 16 as by a mechanical or electrical linkage such as the carriage position transmission system 28 herein.

The carriage position transmission system comprises a conventional selsyn transmitter or generator 102 coupled to the carriage lead screw 36 and a power selsyn receiver or motor 104 connected to the recorder drive shaft 100. The selsyn transmitter and receiver are electrically connected in a conventional self-synchronous positioning circuit by means of which an error signal proportional to the displacement of the rotor of the selsyn generator relative to that of the selsyn motor is transmitted over conductor lines 106 interconnecting the stators of the selsyn units to develop a drive torque in the selsyn motor to move the paper chart.

The probe position transmission system or linkage 30 associated with the tracer pen of the recorder includes a spirally grooved positioning screw 108 which is engaged and rotatably displaced by a pawl 109 on the end of the probe rod 40 opposite the pickup head 42 and further includes an autosyn motor controlled servo positioning system which comprises an autosyn transmitter device 110, an autosyn receiver device 112, a conventional servo amplifier 114, and a two-phase servomotor 116.

The shaft 118 of the spirally grooved positioning screw 108 is operatively coupled to the rotor shaft 111 of the autosyn transmitter 110 the stator winding of which is connected over conductor group lines 120 to the stator winding of the autosyn receiver 112 whose rotor winding is connected to supply an electrical signal corresponding to the displacement thereof by the probe rod to the input of the servo amplifier. The servo amplifier is connected with the control phase winding of the servomotor 116 the other or reference phase winding of which may be connected to a local source of alternating current. The rotor windings of selsyn transmitter 102, the selsyn receiver 104 and the autosyn transmitter 110 also are connected to be energized from the same source of alternating current as that which energizes the reference phase winding of the servomotor. The rotor shaft 122 of the servomotor 116 is mechanically connected through suitable worm and gear arrangements to the shaft of the tracer pen traverse screw 124 of the recorder unit and to the rotor shaft 126 of the autosyn receiver 112, substantially as shown.

Neglecting the modulator action of the pickup probe, the operation of the contour follower servo system thus far described is as follows: As the object, whose contour is to be checked, is moved past the pickup probe, the probe assembly is driven by the servo drive motor 20 into the path of and in a direction to contact the surface of the bucket or object. The direction of rotation of the servo drive motor is controlled by the control unit 24 which selectively controls the direction of current flow through the winding thereof, as follows: When the probe needle 44 makes contact with the object, the normal bias on grid 70 of the dual vacuum tube 66 is altered causing a maximum field current to flow through the reverse field between the terminals 94, 90 of the servo drive motor. The servomotor then rotates in that direction causing the probe to recede from the object. This motion results in breaking the contact between the probe and object, thus restoring the normal bias to grid 70. With normal bias the dual vacuum tube shifts the current through the servomotor split-field to a maximum in the original direction, i. e., between the terminals 92, 90 of the forward field thereof. This results in a form of dynamic braking or plugging of the drive motor followed quickly by rotation in the direction advancing the probe toward the object. Again contact between the probe and object results in reversal of the servomotor.

The repetition of these actions would normally establish a hunting action whose frequency would be determined by the inertias, frictions, and energy relationships of the system. Then if the object were moved in a direction transverse to the probe motion, the probe would follow a line contour of the object within the limits imposed by the hunting action, and the motion of the probe would yield a resulting trace on the recorder in the nature of that shown by the lower curve b of Fig. 4.

In order to obviate any tendency of the system to hunt caused by inertia and other factors, the motion of the probe point is modulated in accordance with the present invention by the action of transducer head 42 which vibrates the probe point at a high rate of repetition and yields a resulting trace on the recorder in the nature of that shown by the upper curve a of Fig. 4.

The modulator includes the necessary elements to provide the proper motion to the probe point and in the functional diagram illustrated comprises an anti-magnetic housing 130, a thin light magnetic diaphragm 132 to which the probe needle 44 is attached, and an activating coil 134 wound on a combination of permanent magnet and soft iron U-shaped magnetic core 136 which resembles an ordinary radio headphone unit and is mounted within the probe housing. The activating coil 134 may be connected directly to conductor lines 98 and 99 to be energized by current flow through the reverse field of the servo drive motor or it may be connected for separate excitation to an audio frequency generator in which case conductor 98 would be connected directly to conductor 99.

To observe the action of the probe modulator, let the servo motor action be disregarded momentarily and assume contact between the probe point and the object. Immediately the bias on grid 70 is reduced and the current in the modulator activating coil 134 builds up sufficiently to pull the probe needle out of contact with the object. This again restores normal bias to the grid 70 thus releasing the modulating coil current, and the inherent spring force of the flexed diaphragm 132 restores contact between the probe needle and the object.

By reason of the mechanical inertia of the servo drive motor and the rest of the system, the drive motor does not change its direction of rotation each time the light probe point contacts the object surface, and the oscillating action of the probe point is repeated thus forming a vibrating contact. This action is similar to that of a doorbell buzzer, except that the vacuum tube 66 obviates the necessity of passing the relatively high activating coil currents through the contacts formed by the needle point and the object surface. With this arrangement the commutated or interrupted contact currents are in the input grid circuit of the control amplifier and are extremely small; i. e., in the order of about 10 microamperes so that there is little wear and erosion at the contact point.

The frequency of the probe vibration is high, say, in the order of from 300 to 800 cycles per second with respect to the natural hunt frequency of the servo system which may be in the order of 10 to 20 cycles per second and thus permits a modulation of the vacuum tube plate currents which control the servo motor split-field in the following manner: First, consider that the probe has advanced toward the object under the relatively slow influence of the servo drive motor so that the probe barely makes contact with the surface of the object presented thereto. Then the modulator vibration frequency will be relatively low and the time of "dwell" or period during which the probe point is actually in contact with the object will be small as compared to the "off" periods, as illustrated by the dashed curves lying above and below, respectively, of the abscissa of Fig. 2A. During these "on" periods the motor field currents tend to reverse. A short pulse of plate current passes through the reverse servo field for each contact of the probe point, the average forward field current becomes somewhat less than maximum by reason of the interruption thereof, and the resulting net magnetizing field current decreases thus diminishing the torque exerted by the motor. The variation in forward field current as the probe approaches this particular contact position is represented by the solid line in Fig. 2A.

Second, consider that the probe has advanced further toward the object by reason of a slight advance of the lead screw of the probe assembly so that the "on" and "off" times of the probe point become more nearly equal. Under this condition, the modulator vibration frequency will be higher and the average servo motor field currents flowing in both the forward and reverse fields nearly balance to effect a net differential zero field current, as shown in Fig. 2B. This condition represents the balance point of the system and no torque is exerted by the motor.

Third, consider the probe advanced still further toward the object so that its modulation vibration amplitude is nearly suppressed. Then the vibration frequency is still higher and the "dwell" or "on" time effectively exceeds the "off" time. Then the average motor field currents approach the maximum value in the opposite direction, as shown in Fig. 2C, and the motor torque is reversed. This torque reversal, augmented by the back electromotive force due to the original direction of motor rotation, first produces dynamic braking and then causes the motor to reverse.

The increase in the modulator vibration frequency may be likened to that occurring in a code practice buzzer when the spacing between the vibrating contacts thereof is decreased by advancing the buzzer control screw. Without attempting to account for all factors that may be involved, consider the action of the probe when it has advanced to a position where it barely contacts the surface of the object. The magnetizing force required to pull the probe point away from the object surface under this condition of approach is extremely small, and the flexure of the magnetic diaphragm, and the consequent opposing restoring spring force thereof will be small. During the interval between contacts of the probe point with the object, the probe is advanced slightly further toward the object so that the distance between the probe point and the object has diminished. A greater magnetizing force then will be required to pull the probe point away from the object surface when the point contacts the object. A greater flexure of the diaphragm will result together with a larger restoring spring force, which, coupled with the fact that the distance between the probe and the object has diminished, necessitates a faster vibration of the probe point.

In the operating conditions described above, just prior to the immediately foregoing matter treating with the variable frequency aspects of the "self-excited" probe modulator, only three of a large series of possible combinations of vibration and "dwell" times were described. These variations combine to form a continuous modulation in the contact region to establish a restoring force which is proportional to the probe displacement deviation from the "balance" position at which point the net field current is zero and no torque is exerted by the motor. For conciseness in this description the term position error is to be construed as the deviation from the "balance" position of the probe. A typical space plot of restoring torque versus the probe position displacement is shown in Fig. 3. During normal operation the servo system would maintain the probe in the proportional region near the balance point.

Any deviation of the probe point from that position, then produces a restoring torque that varies in proportion to the position error and tends to maintain the probe point within a predetermined range of movement or vibration amplitude from the object surface.

Neglecting the effects of the reactive current components of the system, viewed in terms of "dwell" and "off" time of the probe, the aforementioned "balance point" may be considered to correspond to a condition where the time that the probe point is in contact with the object surface effectively equals the time it is out of contact therewith. In this aspect the variation in the dwell and off times for different conditions of approach and recession of the probe may be considered to impart a pulse-time modulation characteristic to the system. In a related connection, the variation in the vibration amplitude or range of vibratory movement of the probe point may be considered to impart a pulse-position modulation characteristic to the system; while the change in frequency or vibration rate of the self-excited probe modulator may be considered to impart a pulse-frequency or repetition modulation characteristic thereto.

In the interest of clarity the reactive elements of the system were omitted in the explanation above. Referring to Fig. 1, a capacitance 140 (shown in dotted lines) shunts the input of the dual vacuum tube 66. This capacitance represents the input capacitance of the tube together with the stray capacitance of the input circuit wiring. The charge and discharge characteristics of this capacitance are determined by the resistance components of the circuit in accordance with the exponential current and potential variations in resistance-capacitance circuits.

Under operating conditions, the vibrating probe contact action varies both the charge and discharge durations together with their repetition rates. The effect is to establish an average D. C. grid potential level on the grid 70 which is dependent on the probe deviation from the "balance" condition.

A similar modification takes place in the tube plate circuits due to the inductance of the motor fields and modulator winding. It may be seen that interaction of these variations takes place between the grid and plate circuits of $P_2$ since the grid potential level is transferred to the plate circuit with amplification and the plate current level in turn reacts upon the grid potential through the modulator action.

The utilization of these reactive current variations offers advantages since their effects are both "frequency" and "dwell" sensitive and tend to extend the proportional control actions over a wider range of probe positions but still hold the over-all control characteristics as shown in Fig. 3. Their effects modify the "dwell" characteristics as shown in the simplified explanation such that the actual "on" times for the contacts vary from only 2 to 20 percent of the modulation cycle. This reduction in contact time further lightens the operating pressure between the probe point and the object.

In ordinary servo nomenclature, a system employing a contactor to control the sensing of a follow-up system would be called a non-linear system. Such arrangements are generally unsuitable because of their characteristic hunting action. In this system the modulator utilizing the dwell time and frequency variations of a contactor has effectively transformed the system into a linear one over a limited range, and a high degree of stabilization and antihunting action has been accomplished by means of which overdriving and overshooting action of the object position by reason of the mechanical inertia of the system, has been eliminated for substantially all practical purposes.

In applications where extremely high stabilizing influences might be required, the proportional error stimulus made available in the present system constitutes a basis for further corrective measures, and it is possible by means of various well-known differentiating circuits to secure correction influences which are proportional to rates of change of the error variations. Then the application of these rate corrections would tend to correct for the error (overshoot) before it can attain an objectionable value, and further safeguard against hunting would be obtained. This type of correction is anticipatory in effect and avoids rapid acceleration of the servo motor when the position errors are low and yet permits rapid probe velocity during conditions of large error. Such correction may be obtained by electrical differentiating inverse feedback circuits associated with the amplifier 24 and/or eddy current discs or magnetic brakes associated with the servo drive motor.

The accuracy of contour following achieved with the present apparatus is very high since there is little or no deformation of the surface being scanned. The vibratory action of the probe point reduces the tendency of the probe to scratch or gouge by reason of the stepping action thereof across the surface of the scanned object, illustrated in Fig. 5, and reduces the probe contact pressure, which is only such as is necessary to establish electrical contact with the object. The small mass and low inertia of the probe needle contributes materially to eliminating the force against the object surface which would assume considerable relative proportion if the mass and inertia effects of the system were permitted to be exerted without the use of an instrumentality as the pickup transducer herein.

While normal application of the contour follower would involve the scanning of metallic objects with good electrical conductivity, it is not limited to use with these materials. In the event that plastic or other elecrically non-conductive objects are to be scanned, a thin coating of moderately conductive material, such as evaporated gold or "Aquadag" may be applied to the surface thereof or the object may be covered with a thin layer of aluminum foil. Objects made of conductive rubber also will result in proper operation.

Although a specific arrangement is shown in Fig. 1, the functional characteristics are not limited to the specific arrangement illustrated and described. For example, the transfer of the modulation components could be accomplished by the employment of an arrangement of relays or transistor, magnetic or dielectric amplifiers in lieu of the vacuum tube amplifier to supply a servo drive unit which may comprise magnetic or piezoelectric clutches in lieu of the split-field servo motor drive. Likewise, other electromechanical transducers in lieu of the specific magnetically actuated probe modulator may be employed to secure the modulation characteristics.

An alternate system for actuating the modulator unit could be used in which a constant frequency external source of power would be applied to the probe modulator coil to produce the vibratory motion of the probe point. Otherwise the system configuration would remain as described heretofore. In this arrangement the frequency of vibration would be constant and the modulation would depend upon the "dwell time" of the probe point against the object surface. While it appears that the self-excited probe modulator arrangement employing both "frequency" and "dwell" variations is possessed of greater inherent stability than the externally excited arrangement, the separately-excited system may prove advantageous in certain applications.

While the invention has been described specifically in connection with its application as a blade contour checking machine, it is capable of numerous other useful applications. For example, the invention can be employed to check wax or metal master patterns for dimensional accuracy before expensive molds and castings are made from them. Similarly, the invention can be employed to check the accuracy of master cams employed in automatic grinding and like machines to facilitate alignment of such equipment. As a duplicating apparatus, the invention can be used to cut dies from master templates, to transfer automobile contours from full size clay models to paper and to control automatic machine tools. In the latter application, for example, the object to be copied could be mounted in a carriage or fixture whose motion relative to the probe and the motion of the probe assembly in a direction to contact the object would be transferred by linkages or position transmission systems similar to those described herein to control the tool and feed mechanism of the machine tool. As a position sensing and following system the invention could be employed in indicating instruments as, for example, in barometer and other devices where it is desired to sense and follow the position of a flexible diaphragm or other element without adding any instrumentality thereto that would restrict or resist the movement thereof. Such arrangements would permit telemetering of instrument readings over a considerable distance from the sensing and following instrumentalities.

What is claimed is:

1. In apparatus for producing a motion related to the movement of an object having an electrically conducting surface, the combination of probe means movable in a direction to contact said object, reversible power operated means supplying a driving force normally driving said probe means in a direction to contact said object, control means connected in electrical circuit relation with said object and said probe means and controlling the energization of said power operated means, said control means reversing the direction of driving movement of said power operated means when said probe means contacts said object and establishes an electrical circuit therethrough, and modulating means carried by said probe means imparting a vibratory motion thereto and regulating the driving force supplied by said power operated means.

2. Apparatus in accordance with claim 1 above wherein said vibratory motion of said probe means causes said means to intermittently contact said object so that the energization of said power operated means varies as the ratio of the time that the probe means is in contact with the object to the time that it is out of contact therewith to regulate the driving force supplied by said power operated means.

3. Apparatus in accordance with claim 1 above wherein said vibratory motion of said probe means causes said means to intermittently contact said object so that the frequency of the vibrations varies in accordance with the displacement of said probe means from the surface of said object over a narrow range of displacement so that variations in the vibratory rate regulates the driving force supplied by said power operated means.

4. Apparatus in accordance with claim 1 above wherein said vibrator has a pulse-time modulation characteristic and a pulse-frequency modulation characteristic for regulating the energization of said power operated means and the driving force supplied thereby.

5. In apparatus for producing a motion related to the movement of an electrically conducting object, the combination of probe means movable in a direction to contact said object, reversible power operated means supplying a driving force normally driving said probe means in a direction to contact said object, control means connected in electrical circuit relation with said object and said probe means and controlling the energization of said power operated means for reversing the direction of driving movement thereof when said probe means contacts said object and establishes an electrical circuit therethrough, and vibratory means carried by said probe means regulating the driving force supplied thereto by said power operated means in accordance with the position of said probe from said object and over a narrow range of movement of said probe means measured from the surface of said object.

6. In apparatus for sensing and following the motion of an object having an electrically conductive surface, the combination of probe means movable in a direction to contact said object, reversible electrical power operated means normally driving said probe means in a direction to contact said object, a source of electrical power for said power operated means, vibratory magnetic modulator means carried by said probe means, said modulator means including an electrically conductive probe point adapted to contact the surface of said object and activating means for vibrating said point, and electrical control means having an input control circuit connected to said object and said probe point and an output circuit connected to said activating means and said reversible power operated means variably controlling the energization of said power operated means.

7. In apparatus for sensing and following the motion of an object having an electrically conductive surface, the combination of probe means movable in a direction to contact said object, reversible electrical power operated means normally driving said probe means in a direction to contact said object, a source of electrical power for said power operated means, vibratory magnetic modulator means carried by said probe means, said modulator means including an electrically conductive probe point adapted to contact the surface of said object and activating means for vibrating said point, and electrical control means having an input control circuit connected to said object and said probe point and an output circuit connected to said reversible power operated means variably controlling the energization of said power operated means, said activating means of said magnetic modulator means being energized from an external constant frequency source of supply.

8. The combination with a source of energizing current, of an electrical pickup transducer including a translatable element adapted to be moved in a predetermined direction, a magnetic core carried by said element, an electrically energizable magnetizing coil on said core adapted to be connected in electrical circuit relation for energization from said energizing source, a thin light magnetic diaphragm position adjacent said core to be attracted thereby when said magnetizing coil is energized, and a light needle-like probe element having one end coupled to said diaphragm and a pointed end positioned adjacent the surface of a foreign object to contact said surface.

9. In apparatus for tracing the contour of an object having an electrically conducting surface including means moving said object in a predetermined path, vibrating probe means movable in a direction to intermittently contact said object, positionable chart means movable in synchronism with the movement of said object and tracer means operatively coupled to said probe means and plotting the movement thereof on said chart means, the combination of reversible power operative means normally driving said probe means in a direction to contact the surface of said object and electrical control means connected in electrical circuit relation with said object and said probe means, said control means controlling the energization of said power operated means and reversing the direction of driving movement thereof in proportion to the amount said probe means contacts the surface of said object and establishes an electrical circuit therethrough.

10. In a contour follower system for producing a trace corresponding to the shape of an electrically conducting object including means moving said object in a predetermined path, electrically conductive vibrating probe means movable in a direction to intermittently contact said object, position transfer means responsive to the position of said probe means, position transfer means responsive to the position of said object, and display means actuated by both said position transfer means, the combination of a source of electrical power, a reversible motor selectively energizable from said power source and normally driving said probe means in a direction to contact said object, and control means connected in electrical circuit relation with said probe means and said object, said control means controlling the selective energization of said motor and reversing the direction of movement thereof in proportion to the amount the probe means contacts the object and establishes an electrical circuit therethrough.

11. In a contour follower system for producing a trace corresponding to the shape of an electrically conducting object including means moving said object in a predetermined path, electrically conductive probe means movable in a direction to contact said object, position transfer means responsive to the position of said probe means, position transfer means responsive to the position of said object, and recording means actuated by both said position transfer means, the combination of a source of electrical power, a reversible motor selectively energizable from said power source and normally driving said probe means in a direction towards said object, and electrical transducer means having an input control circuit connected with said probe means and said object and an output circuit controlling the energization of said motor and reversing the direction of movement thereof when the probe means contact the object and establishes an electrical circuit therethrough.

12. In a contour follower system for producing a trace corresponding to the shape of an electrically conducting object including means for moving said object in rectilinear path, electrically conductive probe means movable in a direction transverse to the path of movement of said object, positionable chart means movable in accordance with the position of said object and tracer means responsive to the position of said probe means and plotting the position thereof on said positionable chart means, the combination of a source of electrical power, a reversible motor having a split-field winding selectively energizable from said power source and normally driving said probe means in a direction towards said object, and amplifying means having an input control circuit connected with said probe means and said object and an output circuit connected with said motor winding reversing the direction of rotation of said motor when said probe means contacts said object and establishes an electrical circuit therethrough.

13. In a contour follower system for producing a trace corresponding to the shape of an object having an electrically conducting surface and including means for moving said object in a rectilinear path, translatable means movable in a direction transverse to the path of movement of said object, positionable chart means movable in accordance with the position of said object and tracer means movable by said translatable means in a direction transverse to the direction of movement of said chart means, the combination of a source of electrical power, magnetic modulator means carried by said translatable means and including an electrically conductive probe point and energizable activating means vibrating the probe point, a reversible motor having a split-field winding selectively energizable from said power source and normally driving said translatable means in a direction towards said object, and amplifying means having an input control circuit connected in circuit with said probe point and said object and an output circuit connected with said energizable activating means of said modulator means and said motor winding.

14. In a contour follower system for producing a trace corresponding to the shape of an object having an electrically conducting surface and including means for moving said object in a rectilinear path, translatable means movable in a direction transverse to the path of movement of said object, positionable chart means movable in accordance with the position of said object and tracer means movable by said translatable means in a direction transverse to the direction of movement of said chart means, the combination of a source of electrical power, magnetic modulator means carried by said translatable means and including an electrically conductive probe point and energizable activating means vibrating the probe point, a constant frequency external supply source connection to energize said activating means of said modulator means, a reversible motor having a split-field winding selectively energizable from said power source and normally driving said translatable means in a direction towards said object, and amplifying means having an input control circuit connected in circuit with said probe point and said object and an output circuit connected with said motor winding.

15. In apparatus for producing a motion related to the movement of an electrically conducting object including translatable means movable in a direction to contact said object and follower means responsive to the movement of said translatable means, the combination of low inertia, reversible power operating means supplying a driving force normally driving said translatable means in a direction towards said object, vibratory means of appreciably lower mass and inertia than said power operated means and including a magnetic diaphragm having a probe point extending therefrom to contact said object and energizable means carried by said translatable means alternately displacing said probe point and diaphragm toward and away from said object, and control means connected in electrical circuit with said probe point and said object and controlling the energization of said power operated means, said control means tending to reverse the direction of driving movement of said power operated means when said probe point contacts said object and establishes an electrical circuit therethrough.

References Cited in the file of this patent

UNITED STATES PATENTS

| | | |
|---|---|---|
| 1,822,841 | Donle | Sept. 4, 1931 |
| 1,831,787 | Goude et al. | Nov. 10, 1931 |
| 1,989,546 | Chapman | Jan. 29, 1935 |
| 2,007,751 | Chapman | July 9, 1935 |
| 2,492,731 | Branson | Dec. 27, 1949 |
| 2,559,575 | Frylund et al. | July 3, 1951 |
| 2,690,373 | Osgood | Sept. 28, 1954 |